United States Patent
Aine et al.

(10) Patent No.: US 11,580,859 B1
(45) Date of Patent: Feb. 14, 2023

(54) VEHICLE LANE CHANGE

(71) Applicant: Apple Inc., Cupertino, CA (US)

(72) Inventors: Sandip Aine, Sunnyvale, CA (US); Moritz Niendorf, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 618 days.

(21) Appl. No.: 16/142,577

(22) Filed: Sep. 26, 2018

Related U.S. Application Data

(60) Provisional application No. 62/685,593, filed on Jun. 15, 2018, provisional application No. 62/564,712, filed on Sep. 28, 2017.

(51) Int. Cl.
 *G08G 1/16* (2006.01)
 *G05D 1/02* (2020.01)
 *G05D 1/00* (2006.01)

(52) U.S. Cl.
 CPC .......... *G08G 1/167* (2013.01); *G05D 1/0088* (2013.01); *G05D 1/0212* (2013.01); *G05D 2201/0213* (2013.01)

(58) Field of Classification Search
 None
 See application file for complete search history.

(56) References Cited

U.S. PATENT DOCUMENTS

| | | | | |
|---|---|---|---|---|
| 5,521,579 A | * | 5/1996 | Bernhard | B60W 30/16 340/438 |
| 8,170,739 B2 | * | 5/2012 | Lee | B62D 15/0255 701/25 |
| 8,706,417 B2 | | 4/2014 | Zeng et al. | |
| 8,914,181 B2 | * | 12/2014 | Essame | G08G 1/161 701/23 |
| 9,096,267 B2 | * | 8/2015 | Mudalige | B62D 15/0255 |

(Continued)

OTHER PUBLICATIONS

Julia Nilsson et al., "Lane Change Maneuvers for Automated Vehicles", Published Aug. 26, 2016 IEEE Transactions on Intelligent Transportation Systems (vol. 18, Issue: 5, May 2017, pp. 1087-1096) https://ieeexplore.ieee.org/document/7553499/figures#figures (Year: 2016).*

(Continued)

*Primary Examiner* — Thomas E Worden
(74) *Attorney, Agent, or Firm* — Young Basile Hanlon & MacFarlane, P.C.

(57) ABSTRACT

Systems and methods for vehicle lane change control are described. Some implementations may include determining a kinematic state of a vehicle moving in an origin lane; detecting, based on data from one or more sensors of the vehicle, objects that are moving in a target lane of the road; determining a headway constraint in terms of a preparation time, a preparation acceleration to be applied to the vehicle during the preparation time, and an execution time during which the vehicle is to transition from the origin lane to the target lane; determining values of the preparation time, the execution time, and the preparation acceleration subject to a set of constraints including the headway constraint; and determining a motion plan that will transition the vehicle from the origin lane to the target lane based at least in part on the preparation time, the execution time, and the preparation acceleration.

20 Claims, 7 Drawing Sheets

(56) References Cited

U.S. PATENT DOCUMENTS

| | | | | |
|---|---|---|---|---|
| 2005/0015203 | A1* | 1/2005 | Nishira | G08G 1/167 701/301 |
| 2008/0201050 | A1* | 8/2008 | Placke | G08G 1/167 701/70 |
| 2013/0211624 | A1* | 8/2013 | Lind | G08G 1/22 701/2 |
| 2014/0032108 | A1* | 1/2014 | Zeng | G08G 1/167 701/533 |
| 2015/0154458 | A1* | 6/2015 | Lee | G06K 9/00798 348/118 |
| 2015/0161895 | A1* | 6/2015 | You | G08G 1/167 701/70 |
| 2015/0194055 | A1* | 7/2015 | Maass | G08G 1/096716 340/905 |
| 2015/0321699 | A1* | 11/2015 | Rebhan | B60W 10/20 701/23 |
| 2015/0353085 | A1* | 12/2015 | Lee | B60W 30/12 701/533 |
| 2016/0091897 | A1* | 3/2016 | Nilsson | B60W 30/16 701/25 |
| 2017/0102705 | A1* | 4/2017 | Silvlin | B60W 30/10 |
| 2017/0267238 | A1* | 9/2017 | Mimura | B60W 10/20 |
| 2018/0079420 | A1* | 3/2018 | Aine | B60W 30/16 |
| 2018/0319403 | A1* | 11/2018 | Buburuzan | G08G 1/167 |
| 2020/0050196 | A1* | 2/2020 | Liao-Mcpherson | G05B 13/048 |
| 2020/0301434 | A1* | 9/2020 | Manna | B60W 60/00 |

OTHER PUBLICATIONS

Wan, L., et. al., "Lane Change Behavior Modeling for Autonomous Vehicles Based on Surroundings Recognition", International Journal of Automotive Engineering 2 (2011) pp. 7-12, JSAE Annual Congress, Sep. 29, 2010 (6 pp).

Ahmad, O., et. al., "Automatic Learning by Autonomous Driver Agents as Applied to Performing Realistic Lane Change Maneuvers", http://citeseerx.ist.psu.edu/viewdoc/download?doi=10.1.1.463.607&rep=rep1&type=pdf, Downloaded Jan. 11, 2018 (7 pp).

Wei, J., et. al., "A Robust Autonomous Freeway Driving Algorithm", 2009 IEEE, https://www.ri.cmu.edu/pub_files/2009/6/IV09_Final.pdf, (6 pp).

IEEE.org, IEEE Explore Digital Library, Julia Nillson, et. al., "Lane Change Maneuvers for Automated Vehicles", IEEE Transactions on Intelligent Transportation Systems, vol. 18, Issue 5, May 2017, pp. 1087-1096 (4 pp).

Chandru, R., et. al., "Safe Autonomous Lane Changes in Dense Traffic", 2017 IEEE 20th International Conference on Intelligent Transportation Systems (ITSC), (6 pp).

* cited by examiner

VEHICLE LANE CHANGE

CROSS-REFERENCE TO RELATED APPLICATIONS

This application claims the benefit of U.S. Provisional Application No. 62/564,712, filed on Sep. 28, 2017, and U.S. Provisional Application No. 62/685,593, filed on Jun. 15, 2018, the contents of which are hereby incorporated by reference in its entirety for all purposes.

TECHNICAL FIELD

This disclosure relates to vehicle lane change control.

BACKGROUND

Automated vehicle control systems are being developed that take on more and more of the work of maneuvering a vehicle. Automated vehicle control systems are able to access and integrate a wealth of information that is practically unavailable to human operators, such as data from a variety of sensors or communications received from other vehicles or traffic control systems, which fundamentally changes the vehicle control problem and provides an opportunity to automatically maneuver vehicles in a far safer and more efficient manner. However, the real world is highly complex and it is challenging to design automated control systems that can robustly handle the wide variety of scenarios that may be encountered on a road with other automated and/or human operated vehicles.

SUMMARY

Disclosed herein are implementations of vehicle lane change control.

In a first aspect, the subject matter described in this specification can be embodied in vehicles that include a vehicle body, actuators operable to cause motion of the vehicle body, one or more sensors configured to detect objects in a space near the vehicle, and an automated control unit. The automated control unit is configured to determine a kinematic state of the vehicle moving in an origin lane along a road with lanes; detect, based at least in part on data from the one or more sensors, one or more objects that are moving in a target lane of the road that is adjacent to the origin lane; determine a prediction of motion of the one or more objects in the target lane; determine a headway constraint in terms of a preparation time, a preparation acceleration to be applied to the vehicle during the preparation time, and an execution time commencing after the preparation time during which the vehicle is to transition from the origin lane to the target lane, wherein the headway constraint is determined based on the kinematic state and the prediction of motion of the one or more objects; determine values of the preparation time, the execution time, and the preparation acceleration subject to a set of constraints including the headway constraint; when it has been determined that the vehicle can transition to the target lane while satisfying the set of constraints, determine a motion plan that will transition the vehicle from the origin lane to the target lane based at least in part on the preparation time, the execution time, and the preparation acceleration; and output commands to the actuators to maneuver the vehicle into the target lane, wherein the commands are based on the motion plan.

In a second aspect, the subject matter described in this specification can be embodied in systems that include a data processing apparatus and a data storage device. The data storage device stores instructions executable by the data processing apparatus that upon execution by the data processing apparatus cause the system to perform operations including: determining a kinematic state of a vehicle moving in an origin lane along a road with lanes; detecting, based at least in part on data from one or more sensors of the vehicle, one or more objects that are moving in a target lane of the road that is adjacent to the origin lane; determining a prediction of motion of the one or more objects in the target lane; determining a headway constraint in terms of a preparation time, a preparation acceleration to be applied to the vehicle during the preparation time, and an execution time commencing after the preparation time during which the vehicle is to transition from the origin lane to the target lane, wherein the headway constraint is determined based on the kinematic state and the prediction of motion of the one or more objects; determining values of the preparation time, the execution time, and the preparation acceleration subject to a set of constraints including the headway constraint; when it has been determined that the vehicle can transition to the target lane while satisfying the set of constraints, determining a motion plan that will transition the vehicle from the origin lane to the target lane based at least in part on the preparation time, the execution time, and the preparation acceleration; and outputting commands to actuators to maneuver the vehicle into the target lane, wherein the commands are based on the motion plan.

In a third aspect, the subject matter described in this specification can be embodied in methods that include determining a kinematic state of a vehicle moving in an origin lane along a road with lanes; detecting, based at least in part on data from one or more sensors of the vehicle, one or more objects that are moving in a target lane of the road that is adjacent to the origin lane; determining a prediction of motion of the one or more objects in the target lane; determining a headway constraint in terms of a preparation time, a preparation acceleration to be applied to the vehicle during the preparation time, and an execution time commencing after the preparation time during which the vehicle is to transition from the origin lane to the target lane, wherein the headway constraint is determined based on the kinematic state and the prediction of motion of the one or more objects; determining values of the preparation time, the execution time, and the preparation acceleration subject to a set of constraints including the headway constraint; when it has been determined that the vehicle can transition to the target lane while satisfying the set of constraints, determining a motion plan that will transition the vehicle from the origin lane to the target lane based at least in part on the preparation time, the execution time, and the preparation acceleration; and outputting commands to actuators to maneuver the vehicle into the target lane, wherein the commands are based on the motion plan.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
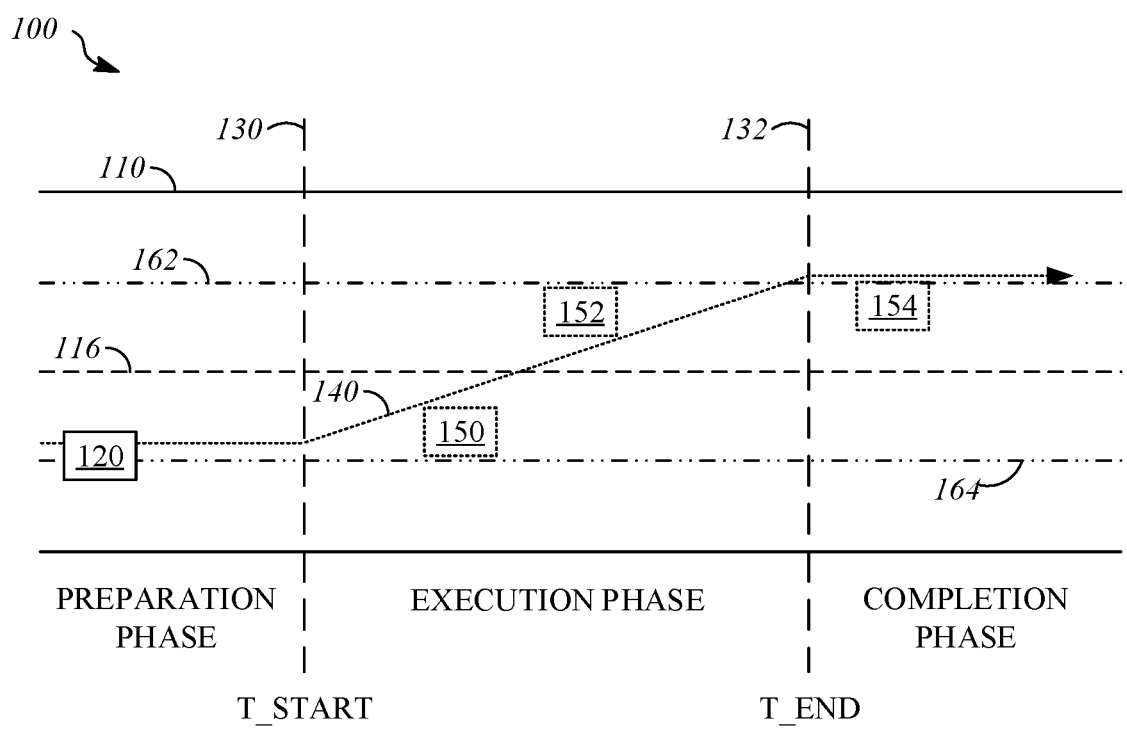
FIG. 1 is an illustration of an example of a lane change maneuver of a vehicle.

Lane change maneuvers are important for autonomous vehicles. This disclosure describes an approach for an integrated decision making and trajectory determination solution for lane change maneuver motion planning. The decision making component decides the behavioral pattern to be followed by an autonomous vehicle and the trajectory determination component computes the actual lane change trajectory for performing the maneuver. Note that the decision making component and the trajectory component may work in a symbiotic manner to enable a successful lane change.

The lane change problem may be specified using input parameters including: (1) a current kinematic state (e.g., position, orientation, linear velocities, and angular velocities) of an ego vehicle to be maneuvered; (2) a planning horizon in time (the duration of motion plan); (3) an origin lane (i.e., the lane in which the ego vehicle starts the maneuver) and a target lane (i.e., the lane into which the ego vehicle will transition during the lane change); and (4) predictions for other static/dynamic obstacles in the origin and target lanes for the duration of the planning horizon).

The decision making component either decides that a desired lane change is not possible, i.e., the problem is unsolvable under the current constraints, or chooses a gap in the target lane into which ego vehicle can maneuver. When a lane change is feasible, the decision making component may provide the trajectory determination component with an identification of the chosen gap, a temporal parametrization of the phases of the lane change maneuver, and an initial guess for the acceleration profile to be used during the lane change maneuver.

This approach to lane change problem includes adjusting the lane boundary constraints such that the vehicle uses the ego lane corridor during a preparation phase before a start time, uses both lanes to perform the transition during an execution phase in a time window between the start time and an end time, and finally only uses the target lane during a completion phase for computing the rest of the plan. We also use an attract/repel mechanism for smooth transition. During the three different phases of the lane change maneuver we enforce distance based and physics based separation constraints between the ego vehicle and vehicles in the origin lane and target lane. Given the kinematic state of the ego vehicle and predictions for other static/dynamic objects in the origin lane and target lane, the decision making component identifies a gap into which to lane change, a temporal parametrization of the lane change maneuver, and an initial guess for the acceleration profile. This is used by trajectory determination component to compute the final motion plan.

Using this approach for motion planning lane changes may offer a number of advantages over other approaches that use a uniform planner irrespective of the planning maneuver. When a uniform planner is used, the lane change maneuver differs from others (e.g., in lane driving, planning for intersection), only in the manner that the problem is setup (e.g., specific targets and behavioral restrictions). In contrast, this approach uses a new planner for lane change which uses different cost functions, maneuver windows and constraints suited for lane change. This approach may help in a variety of ways. First, as this planner is specialized for lane change, we need not adjust its behavior to cater to other planning problems (e.g., in lane motion), which means each planner can optimize its behavior independently and not requiring to adjust for a uniform solution. Second, this approach provides the flexibility to evaluate different maneuver solutions (computed in parallel) and choose the best suited one at a higher level. Third, the specialized optimization-based approach allows for broader set of operational conditions as it increases flexibility by identifying a lane change maneuver in terms of a homotopy class and parametrization, rather than only attempting to compute a lane change maneuver using a fixed homotopy (e.g., the closest gap to the ego vehicle) or fixed parametrization (e.g., only considering maneuvers that are executable with a fixed start time rather than making the start time a parameter of the problem that is determined dynamically).

FIG. 1 is an illustration of an example of a lane change maneuver 100 of a vehicle. The lane change maneuver 100 will be executed on a road 110 that is divided into two lanes separated by a lane divider 116. The vehicle is in a current position 120 in an origin lane, which is below the lane divider 116. A motion plan is determined to transition the vehicle from the origin lane to a target lane, which is above lane divider 116. The overall planning of the maneuver is divided into three phases, i) Preparation phase: where the ego vehicle adjusts its speed/acceleration etc., to perform the lane change; ii) Execution phase: where the actual lane transition is performed; and iii) Completion phase: where the ego vehicle is fully in the target lane, it adjusts its speed/acceleration profile etc. for in lane motion. The planning problem may define these phase durations either fully (overall planning horizon, start and end of execution phase) or partially. At the start time 130, the vehicle will begin its transition from the origin lane into the target lane, moving along a path 140, and taking future positions 150 and 152 as it crosses the lane divider 116. The transition will be completed by the end time 132, at which point the vehicle will continue moving along path 140 taking future positions in the target lane, e.g., position 154. In some implementations, terms relating to center line 162 of the target lane and/or a center line 164 of the origin lane may be incorporated in a cost function of an optimization routine used by trajectory determination component to determine a motion plan for the lane transition.

Parameters may be set to configure a decision making component. The parameters may be used to determine a set of constraints on the motion plan. For example, these configuration parameters may include:

a_e_l—The maximum admissible deceleration of the ego vehicle when leading.

a_e_t—The maximum admissible deceleration of the ego vehicle when trailing.

a_c—The maximum admissible acceleration of the ego vehicle for aligning itself with a gap.

a_o_l—The maximum expected nominal deceleration of an object when leading.

a_o_t—The maximum expected nominal deceleration of an object when trailing.

t_l—The latency of the ego vehicle.

t_l_o—The latency of an object when trailing the ego vehicle.

d_min—The minimum longitudinal distance between two stopped vehicles.

To describe the operation of examples of decision making components, it is useful to define some symbols including:

d_stop_o_l—The stopping distance of a leading object.

d_stop_o_t—The stopping distance of a trailing object.

d_stop_e_l—The stopping distance of the ego vehicle when leading.

d_stop_e_t—The stopping distance of the ego vehicle when trailing.

v_e—The velocity of the ego vehicle.

v_o_l—The velocity of a leading vehicle.

v_o_t—The velocity of a trailing vehicle.

h_min—The minimum headway with respect to a leading vehicle.

h_min_rear—The minimum headway with respect to a rear vehicle.

t_h—The time horizon for motion planning t_0—The initial time of the motion planning problem.

t_p—The preparation time (e.g., the start time 130 of FIG. 1).

t_w—The time when the lane change window closes (e.g., the end time 132 of FIG. 1).

a_p—The acceleration of the ego vehicle during the preparation phase.

d_o_e—The distance between an object and the ego vehicle at t_0.

d_o_l_orig_e—The distance between the lead object in the origin lane and the ego vehicle at t_0.

d_o_r_orig_e—The distance between the trailing object in the origin lane and the ego vehicle at t0.

d_o_l_targ_e—The distance between the lead object in the target lane and the ego vehicle at t_0.

d_o_r_targ_e—The distance between the trailing object in the target lane and the ego vehicle at t_0.

d_min_trail—The minimum trailing distance.

d_min_lead—The minimum lead distance.

v_o_l_orig—The velocity of the lead object in the origin lane.

v_o_l_targ—The velocity of the lead object in the target lane.

v_o_r_orig—The velocity of the rear object in the origin lane.

v_o_r_targ—The velocity of the rear object in the target lane.

n—The number of vehicles in the target lane.

k—The index identifying a gap in the target lane.

β—The weight to trade off acceleration and the lane change time window.

y—An auxiliary variable.

v_max—The maximum admissible velocity of the ego vehicle.

A decision making component may determine a number of constraints on the motion plan relating to longitudinal separation along the road between the ego vehicle and other objects (e.g., other vehicles) on the road. The following principles may be used to determine longitudinal separation constraints, which are first described in relation to vehicles that are associated with the origin lane (i.e., the lane in which the ego vehicle is driving at the beginning of the lane change maneuver) as an example. This approach generalizes to vehicles associated with the target lane. A guiding design principle for longitudinal separation between ego and other objects is the notion of headway.

Headway is a distance (e.g., from bumper to bumper) between two vehicles traveling in the same lane of a road. A headway may also be expressed as a time that it would take a vehicle to travel the distance between the two vehicles at the trailing vehicle's current speed. A headway constraint specifies a minimum headway that should be maintained between vehicles. A headway constraint may be a function of vehicle speed (e.g., the faster a vehicle is moving, the larger the headway maintained should be) and/or relative speeds of other objects (e.g., other vehicles). A headway constraint may be determined by laws applying on a road. A headway constraint may be a design feature of a vehicle control system added to enhance safety. A headway constraint may be different for the headway maintained to vehicles ahead of the vehicle being controlled (i.e., the ego vehicle) than for the headway maintained to vehicles behind the ego vehicle. For example, the ego vehicle may assume responsibility to maintain a larger headway to a vehicle ahead of the ego vehicle than it assumes to maintain headway to a vehicle behind the ego vehicle.

Figure 2:
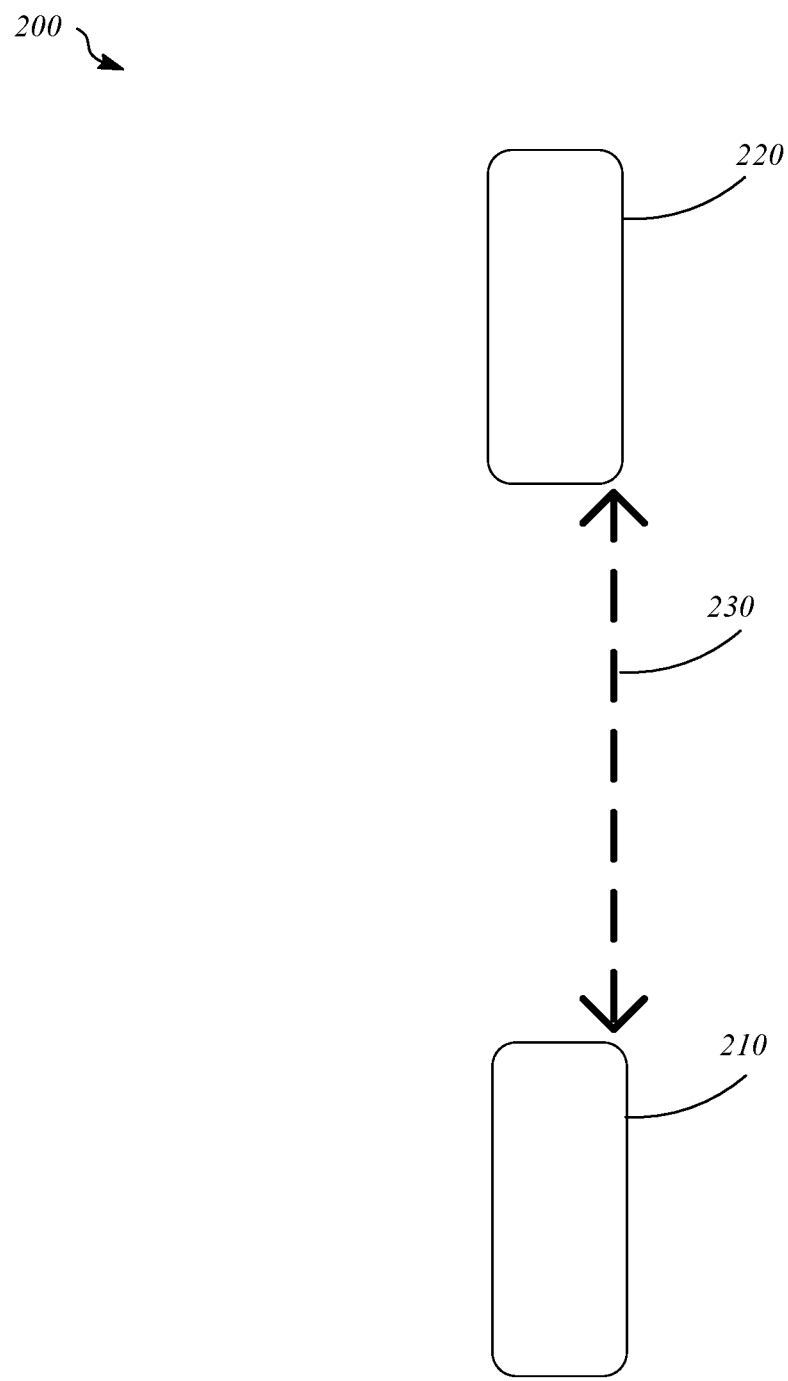
FIG. 2 is an illustration of a pair of vehicles traveling with headway between them.

FIG. 2 is an illustration of a pair of vehicles 200 traveling with headway between them. An ego vehicle 210 trails a leading vehicle 220 as the two vehicle travel along a road. In this example, a headway 230 between the ego vehicle 210 trails and the leading vehicle 220 is the distance between the rear bumper of the leading vehicle 220 and the front bumper of the ego vehicle 210. The ego vehicle 210 may be configured to maintain at least a minimum value of the headway 230 during maneuvers. In some implementations, a motion plan may be determined based in part on a constraint on the headway 230.

An ego vehicle trailing an object gives rise to the notion of headway (see FIG. 2) and an object trailing the ego vehicle gives rise to the notion rear headway that may be defined analogously. If the ego vehicle is trailing the object, the stopping distance d_stop_o_l of the object may be computed as:

$$d\_stop\_o\_l = v\_o\_l^2/(2*a\_o\_l) \quad \text{(EQ 1)}$$

The stopping distance d_stop_e_t of the ego vehicle may be computed as:

$$d\_stop\_e\_t = (t\_l*v\_e) + (v\_e^2/(2*a\_e\_t)) \quad \text{(EQ 2)}$$

The minimum headway hmin may be given by:

$$h\_min = d\_min + d\_stop\_e\_t - d\_stop\_o\_l \quad \text{(EQ 3)}$$

Finally, the minimum trailing distance d_min_trail of the ego vehicle to an object is a headway constraint subject to a lower bound independent of the kinematic state that may be given as:

$$d\_min\_trail = \max(d\_min, h\_min) \quad \text{(EQ 4)}$$

If the ego vehicle is the lead vehicle, the rear headway may be computed as follows. The stopping distance d_stop_o_t of the trailing vehicle is computed as:

$$d\_stop\_o\_t = (v\_o\_t^2/(2*a\_o\_t)) + (v\_o\_t*t\_l\_o) \quad \text{(EQ 5)}$$

The stopping distance d_stop_e_l of the ego vehicle when leading may be computed as:

$$d\_stop\_e\_l = v\_e^2/(2*a\_e\_l) \quad \text{(EQ 6)}$$

The minimum rear headway h_min_rear may be given by:

$$h\_min\_rear = d\_min + d\_stop\_o\_t - d\_stop\_e\_l \quad \text{(EQ 7)}$$

Thus, the minimum lead distance d_min_lead may be given by:

$$d\_min\_lead = \max(d\_min, h\_min\_rear) \quad \text{(EQ 8)}$$

The choice of the parameters a_o_l, a_e_l, a_o_t, a_e_t and the difference between them allows for more conservative behavior. In some implementations, these parameters may be further parameterized by environmental conditions, the class of the object (e.g., trucks, busses, or cars), the planned trajectory, and/or other parameters.

The above provides a parametrization for longitudinal separation. By choice of the parameters the resulting headway constraints can be changed substantially. Similarly, rear headway and headway with respect to a leading object can be asymmetric. For example, the rear headway could be collapsed to a fixed rear distance buffer by appropriate choice of parameters. In some implementations, a_e_t≤a_o_l and a_e_l>=a_o_t.

A lane change maneuver may be specified by a set of parameters. For example, parameters of a lane change maneuver may identify a gap between objects in the target lane into which the ego vehicle will move, and a time period, the execution phase, during which the ego vehicle will transition from the origin lane to the target lane. The following example describes a parametrization of a gap in terms of vehicles in the target lane and the temporal parametrization of the three phases of a lane change maneuver.

Figure 3:
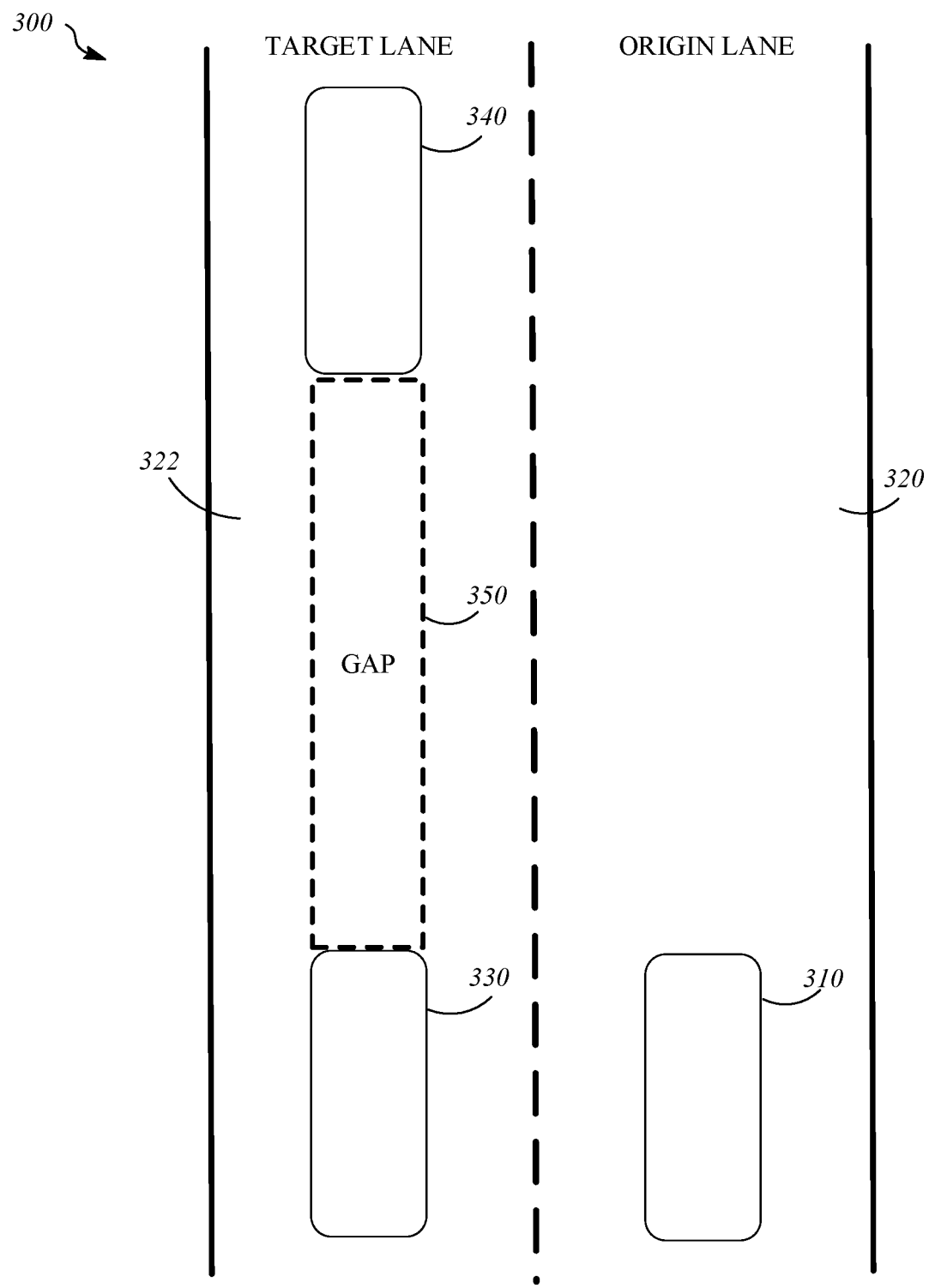
FIG. 3 is an illustration of an example of lane change scenario.

FIG. 3 is an illustration of an example of lane change scenario 300. In the lane change scenario 300, an ego vehicle 310 (e.g., the vehicle 400 of FIG. 4) is traveling along an origin lane 320 that is adjacent to a target lane 322. A k-th target lane object 330 (e.g., a vehicle) and a (k+1)-th target lane object 340 (e.g., a vehicle) are traveling in the target lane 322. There is a k-th gap 350 between the k-th target lane object 330 and the (k+1)-th target lane object 340. For example, a decision making component of the ego vehicle 310 may be configured to identify the k-th gap 350 in the target lane 322 and a trajectory determination component may determine motion for maneuvering the ego vehicle 310 into the k-th gap 350.

In other lane change scenarios (not shown in FIG. 3), either the k-th target lane object 330, the (k+1)-th target lane object 340, or both vehicles may not be present. In such a scenario the k-th gap may extend to the horizon on either one side respectively or on both sides.

Let k denote the k-th gap in a target lane. Hence, for n vehicles in the target lane there exist n+1 gaps, e.g., the 0-th gap is located behind the first vehicle in the target lane, and the k-th gap is located in front of the k-th vehicle in the target lane. When executing the optimization based decision making approach an assumption may be made that all vehicles other than the ego vehicle maintain a constant speed until the ego vehicle has completed the lane change. This decision making step may be re-performed when a lane change motion plan is being updated periodically during a maneuver for lane change. Thus this is not a very restrictive assumption as changes to the speed of other vehicles may be handled in a reactive manner within the decision making stage of motion planning. Note that the trajectory determination step of motion planning does not need to be bound by the same assumption.

To facilitate efficient search, a lane change maneuver may be broken down into three phases: (1) a preparation phase in which the ego vehicle is in its origin lane and may accelerate to align with an identified gap; (2) an execution phase during which the ego vehicle occupy space in both the origin lane and the target lane while it transitions between the origin lane and the target lane; and (3) a conclusion phase in which the ego vehicle is in the target lane and out of the origin lane. During the preparation phase the ego vehicle is fully contained in the origin lane and its direction of travel may be aligned with the direction of the road up to some threshold. The execution phase follows the preparation phase. The conclusion phase may begin when the ego vehicle is fully contained in the target lane and its direction of travel may be aligned with the direction of the road. However, this description of the transition between phases depends on the path of the ego vehicle, which is not necessarily known a priori. Thus a temporal characterization of the three phases may be useful to specify a lane change maneuver before the exact motion plan or path of the ego vehicle are known. The ego vehicle should be able to be maneuvered to align itself with a given gap in the target lane within the time horizon t_h, otherwise the lane change into that gap is infeasible.

Given a time horizon t_h and a gap, a time window may be determined within which the execution phase could fall. This may yield an upper bound on the duration of the execution phase. A motion plan for the lane change may align the ego vehicle with the gap in the target lane while satisfying headway constraints with respect to a leading vehicle and trailing vehicle in the ego lane as well as a leading vehicle and a trailing vehicle of a specific gap in the target lane.

In order to align with a gap ego may have to accelerate in order to pass the rear object (e.g., a vehicle) in the target lane, i.e., satisfy the minimum rear headway constraint with respect to the rear object. The ego vehicle may have to decelerate in order to stay behind the lead object in the target lane, i.e., satisfy the minimum headway constraint with respect to the lead object.

The closest rear vehicle and the closest lead vehicle in the origin lane are detected. Let d_o_e denote the distance between an object and the ego vehicle at t_0 and v_e denote the velocity of the ego vehicle. Assuming constant speed of the objects, the acceleration a_p applied by the ego vehicle for the duration of the preparation phase may be chosen to satisfy the following inequalities at the beginning of the lane change window, i.e., at the end of the preparation time t_p. Regarding headway constraints for origin lane objects:

$$h\_min(a\_p) \leq d\_o\_l\_orig\_e + v\_o\_l\_orig*t\_p - (v\_e*t\_p + 0.5*a\_p*t\_p\hat{\ }2), h\_min\_rear(a\_p) \leq d\_o\_r\_orig\_e + (v\_e*t\_p + 0.5*a\_p*t\_p\hat{\ }2) - v\_o\_r\_orig*t\_p \quad (EQ\ 9)$$

Note that the minimum headway is a function of the stopping distance of the ego vehicle. Therefore it is a function of the velocity of the ego vehicle and hence of a_p. Regarding headway constraints for target lane objects:

$$h\_min(a\_p) \leq d\_o\_l\_targ\_e + v\_o\_l\_targ*t\_p - (v\_e*t\_p + 0.5*a\_p*t\_p\hat{\ }2), h\_min\_rear(a\_p) \leq d\_o\_r\_targ\_e + (v\_e*t\_p + 0.5*a\_p*t\_p\hat{\ }2) - v\_o\_r\_targ*t\_p \quad (EQ\ 10)$$

Again, note that the minimum headway is a function of the stopping distance of the ego vehicle. Therefore it is a function of the velocity of the ego vehicle and hence of a_p. The acceleration of the ego vehicle may be chosen to satisfy constraints:

$$-a\_c \leq a\_p \leq a\_c \quad (EQ\ 11)$$

The lane change execution phase may be constrained to start within the time horizon:

$$0 \leq t\_p \leq t\_h \quad (EQ\ 12)$$

The following observations may be made. For one choice of a_p there exists a range of t_p that correspond to possible times to open the lane change window. The choice of t_p defines the time, at which the lane change window opens. Given constraints on headway and minimum distance buffers to origin lane and target lane vehicles, the lane change window closes at t_w. While the lane change window is open the ego vehicle satisfies all headway constraints with respect to the lead and the rear vehicle both in origin lane and in the target lane. Regarding headway constraints for origin lane objects at time t_w:

$$h\_min(a\_p) \leq d\_o\_l\_orig\_e + v\_o\_l\_orig*t\_w - (v\_e*t\_w + 0.5*a\_p*t\_p\hat{}2 + a\_p*t\_p*(t\_w - t\_p)),$$

$$h\_min\_rear(a\_p) \leq d\_o\_r\_orig\_e + (v\_e*t\_w + 0.5*a\_p*t\_p\hat{}2 + a\_p*t\_p*(t\_w - t\_p)) - v\_o\_r\_orig*t\_w \quad (EQ\ 13)$$

Note that the minimum headway during the execution phase may be constant since the ego vehicle and the objects are assumed to maintain their respective speeds during this phase. Regarding headway constraints for target lane objects at time t_w:

$$h\_min(a\_p) \leq d\_o\_l\_targ\_e + v\_o\_l\_targ*t\_w - (v\_e*t\_w + 0.5*a\_p*t\_p\hat{}2 + a\_p*t\_p*(t\_w - t\_p)),$$

$$h\_min\_rear(a\_p) \leq -d\_o\_r\_targ\_e + (v\_e*t\_w + 0.5*a\_p*t\_p\hat{}2 + a\_p*t\_p*(t\_w - t\_p)) - v\_o\_r\_targ*t\_w \quad (EQ\ 14)$$

Note that the minimum headway during the execution phase is constant. Lane change execution may be constrained to terminate within the time horizon:

$$0 \leq t\_w \leq t\_h \quad (EQ\ 15)$$

The minimum distance buffer may be maintained for origin lane objects at time t_w:

$$d\_min \leq d\_o\_l\_orig\_e + v\_o\_l\_orig*t\_w - (v\_e*t\_w + 0.5*a\neg\_p*t\_p\hat{}2 + a\_p*t\_p*(t\_w - t\_p)),$$

$$d\_min \leq d\_o\_r\_orig\_e + (v\_e*t\_w + 0.5*a\_p*t\_p\hat{}2 + a\_p*t\_p*(t\_w - t\_p)) - v\_o\_r\_orig*t\_w \quad (EQ\ 16)$$

The longitudinal minimum distance buffer constraints must be satisfied for target lane objects at time t_w:

$$d\_min \leq d\_o\_l\_targ\_e + v\_o\_l\_targ*t\_w - (v\_e*t\_w + 0.5*a\_p*t\_p\hat{}2 + a\_p*t\_p*(t\_w - t\_p)),$$

$$d\_min \leq d\_o\_r\_targ\_e + (v\_e*t\_w + 0.5*a\_p*t\_p\hat{}2 + a\_p*t\_p*(t\_w - t\_p)) - v\_o\_r\_targ*t\_w \quad (EQ\ 17)$$

Note that the intersection of the set of solutions to (EQ 13) and (EQ 14) is a subset of the set of solutions to (EQ 9) and (EQ 10).

For example, determining a best lane change into a given gap in the target lane can be formulated as an optimization problem that maximizes (t_w−t_p), while minimizing |a_p| subject to (EQ 11), (EQ 12), (EQ 13), (EQ 14), (EQ 15), (EQ 16), and (EQ 17). A trade-off between maximizing the time window while minimizing the deviation from the current velocity of the ego vehicle by the introduction of a parameter β, where 0≤β≤1.

min_[a_p, t_p, t_w] (−β*(t_w−t_p)+(1−β)*|a_p|)
subject to:

$$d\_min + t\_l*(v\_e + a\_p*t\_p) + (v\_e + a\_p*t\_p)\hat{}2/(2*a\_e\_t)) - v\_o\_l\_orig\hat{}2/(2*a\_o\_l) \leq d\_o\_l\_orig\_e + v\_o\_l\_orig*t\_w - (v\_e*t\_w + 0.5*a\_p*t\_p\hat{}2 + a\_p*t\_p*(t\_w - t\_p)),$$

$$d\_min + v\_o\_r\_orig\hat{}2/(2*a\_o\_t) + v\_o\_r\_orig*t\_l\_o - (v\_e + a\_p*t\_p)\hat{}2/(2*a\_e\_l) \leq d\_o\_r\_orig\_e + (v\_e*t\_w + 0.5*a\_p*t\_p\hat{}2 + a\_p*t\_p*(t\_w - t\_p)) - v\_o\_r\_orig*t\_w,$$

$$d\_min + t\_l*(v\_e + a\_p*t\_p) + (v\_e + a\_p*t\_p)\hat{}2/(2*a\_e\_t)) - v\_o\_l\_targ\hat{}2/(2*a\_o\_l) \leq d\_o\_l\_targ\_e + v\_o\_l\_targ*t\_w - (v\_e*t\_w + 0.5*a\_p*t\_p\hat{}2 + a\_p*t\_p*(t\_w - t\_p)),$$

$$d\_min + v\_o\_r\_targ\hat{}2/(2*a\_o\_t) + v\_o\_r\_targ*t\_l\_o - (v\_e + a\_p*t\_p)\hat{}2/(2*a\_e\_l) \leq d\_o\_r\_targ\_e + (v\_e*t\_w + 0.5*a\_p*t\_p\hat{}2 + a\_p*t\_p*(t\_w - t\_p)) - v\_o\_r\_targ*t\_w,$$

$$d\_min \leq d\_o\_l\_orig\_e + v\_o\_l\_orig*t\_w - (v\_e*t\_w + 0.5*a\neg\_p*t\_p\hat{}2 + a\_p*t\_p*(t\_w - t\_p)),$$

$$d\_min \leq d\_o\_r\_orig\_e + (v\_e*t\_w + 0.5*a\_p*t\_p\hat{}2 + a\_p*t\_p*(t\_w - t\_p)) - v\_o\_r\_orig*t\_w,$$

$$d\_min \leq d\_o\_l\_targ\_e + v\_o\_l\_targ*t\_w - (v\_e*t\_w + 0.5*a\_p*t\_p\hat{}2 + a\_p*t\_p*(t\_w - t\_p)),$$

$$d\_min \leq d\_o\_r\_targ\_e + (v\_e*t\_w + 0.5*a\_p*t\_p\hat{}2 + a\_p*t\_p*(t\_w - t\_p)) - v\_o\_r\_targ*t\_w,$$

$$0 \leq t\_p \leq t\_w \leq t\_h,$$

$$-a\_c \leq a\_p \leq a\_c,$$

$$0 \leq v\_e + a\_p*t\_p \leq v\_\max \quad (EQ\ 18)$$

Introducing an auxiliary variable y, the absolute value can be eliminated from the objective function. As introduced above, let k denote the k-th gap in the target lane. Then, we augment the notation as follows: For all target lane vehicles subscript l(k), r(k) denotes the lead or the rear vehicle of the k-th gap respectively. For example, d_o_l(k)_targ_e is the distance between the ego vehicle and the lead vehicle of the k-th gap in the target lane. For k=0 all constraints pertaining to a rear vehicle in the target lane are dropped. For k=n all constraints pertaining to the lead vehicle in the target lane are dropped.

min_[a_p, t_p, t_w, y, k] (−β*(t_w−t_p)+(1−β)*y)
subject to:

$$d\_min + t\_l*(v\_e + a\_p*t\_p) + (v\_e + a\_p*t\_p)\hat{}2/(2*a\_e\_t)) - v\_o\_l\_orig\hat{}2/(2*a\_o\_l) \leq d\_o\_l\_orig\_e + v\_o\_l\_orig*t\_w - (v\_e*t\_w + 0.5*a\_p*t\_p\hat{}2 + a\_p*t\_p*(t\_w - t\_p)),$$

$$d\_min + v\_o\_r\_orig\hat{}2/(2*a\_o\_t) + v\_o\_r\_orig*t\_l\_o - (v\_e + a\_p*t\_p)\hat{}2/(2*a\_e\_l) \leq d\_o\_r\_orig\_e + (v\_e*t\_w + 0.5*a\_p*t\_p\hat{}2 + a\_p*t\_p*(t\_w - t\_p)) - v\_o\_r\_orig*t\_w,$$

$$d\_min + t\_l*(v\_e + a\_p*t\_p) + (v\_e + a\_p*t\_p)\hat{}2/(2*a\_e\_t)) - v\_o\_l(k)targ\hat{}2/(2*a\_o\_l) \leq d\_o\_l(k)\_targ\_e + v\_o\_l(k)targ*t\_w - (v\_e*t\_w + 0.5*a\_p*t\_p\hat{}2 + a\_p*t\_p*(t\_w - t\_p)),$$

$$d\_min + v\_o\_r(k)targ\hat{}2/(2*a\_o\_t) + v\_o\_r(k)targ*t\_l\_o - (v\_e + a\_p*t\_p)\hat{}2/(2*a\_e\_l) \leq d\_o\_r(k)\_targ\_e + (v\_e*t\_w + 0.5*a\_p*t\_p\hat{}2 + a\_p*t\_p*(t\_w - t\_p)) - v\_o\_r(k)targ*t\_w,$$

$$d\_min \leq d\_o\_l\_orig\_e + v\_o\_l\_orig*t\_w - (v\_e*t\_w + 0.5*a\neg\_p*t\_p\hat{}2 + a\_p*t\_p*(t\_w - t\_p)),$$

$$d\_min \leq d\_o\_r\_orig\_e + (v\_e*t\_w + 0.5*a\_p*t\_p\hat{}2 + a\_p*t\_p*(t\_w - t\_p)) - v\_o\_r\_orig*t\_w,$$

$$d\_min \leq d\_o\_l(k)\_targ\_e + v\_o\_l(k)targ*t\_w - (v\_e*t\_w + 0.5*a\_p*t\_p\hat{}2 + a\_p*t\_p*(t\_w - t\_p)),$$

$$d\_min \leq d\_o\_r(k)\_targ\_e + (v\_e*t\_w + 0.5*a\_p*t\_p\hat{}2 + a\_p*t\_p*(t\_w - t\_p)) - v\_o\_r(k)targ*t\_w,$$

$$a\_p \leq y,$$

$$-a\_p \leq y,$$

$$0 \leq t\_p \leq t\_w \leq t\_h,$$

$$-a\_c \leq a\_p \leq a\_c,$$

$$0 \le v\_e + a\_p * t\_p \le v\_\max,$$

$$0 \le k \le n+1 \quad \text{(EQ 19)}$$

Where k is an integer and the other parameters are reals.

Solving optimization problem (EQ 19) may identify a best gap for a lane change maneuver, provides a temporal characterization of the maneuver, and an initial value of an acceleration profile for the ego vehicle.

If a higher level entity controlling the ego vehicle (e.g., a navigation routine or an operator) pre-specifies certain parts of the lane change planning (e.g., limits the choice of gaps or requires a minimum preparation time) this can be enforced by imposing additional constraints. The above optimization formulation is hence expressive enough to address the full lance change problem but also flexible enough to allow for pre-specified planning problems through the addition of constraints.

Once the above optimization problem has been solved in a decision making component (e.g., the decision making component 460 of FIG. 4) of motion planning, its output is used to initialize a trajectory determination component (e.g., the trajectory determination component 470 of FIG. 4) as follows:

- The lane boundary constraints are adjusted such that the vehicle uses the origin lane corridor during the preparation phase, uses both lanes (to perform the transition) during the execution phase, and finally only uses the target lane during the completion phase for computing the motion plan.
- The identified gap defines a homotopy class of the motion plan (e.g., which vehicles to pass, which vehicles to stay behind, and which vehicles to stay ahead of).
- The acceleration a_p and resulting velocity profile serve as initial guesses for the acceleration profile that is computed by the trajectory determination component.

The lane change motion planning approach described above can be used to determine an initial lane change motion plan. After this motion plan is determined and the vehicle begins to maneuver according to the motion plan, we re-plan in each iteration by adjusting the input data to the motion planning problem. For re-planning episodes, the above optimization based decision making component is executed until the ego vehicle transits to the target lane, as after this transition the overtaking decisions become redundant, since any vehicle ahead of ego cannot be overtaken and any vehicle behind will remain behind, as they are all in the same lane. In some implementations, re-planning iterations are performed at a frequency of approximately 10 Hz.

Figure 4:
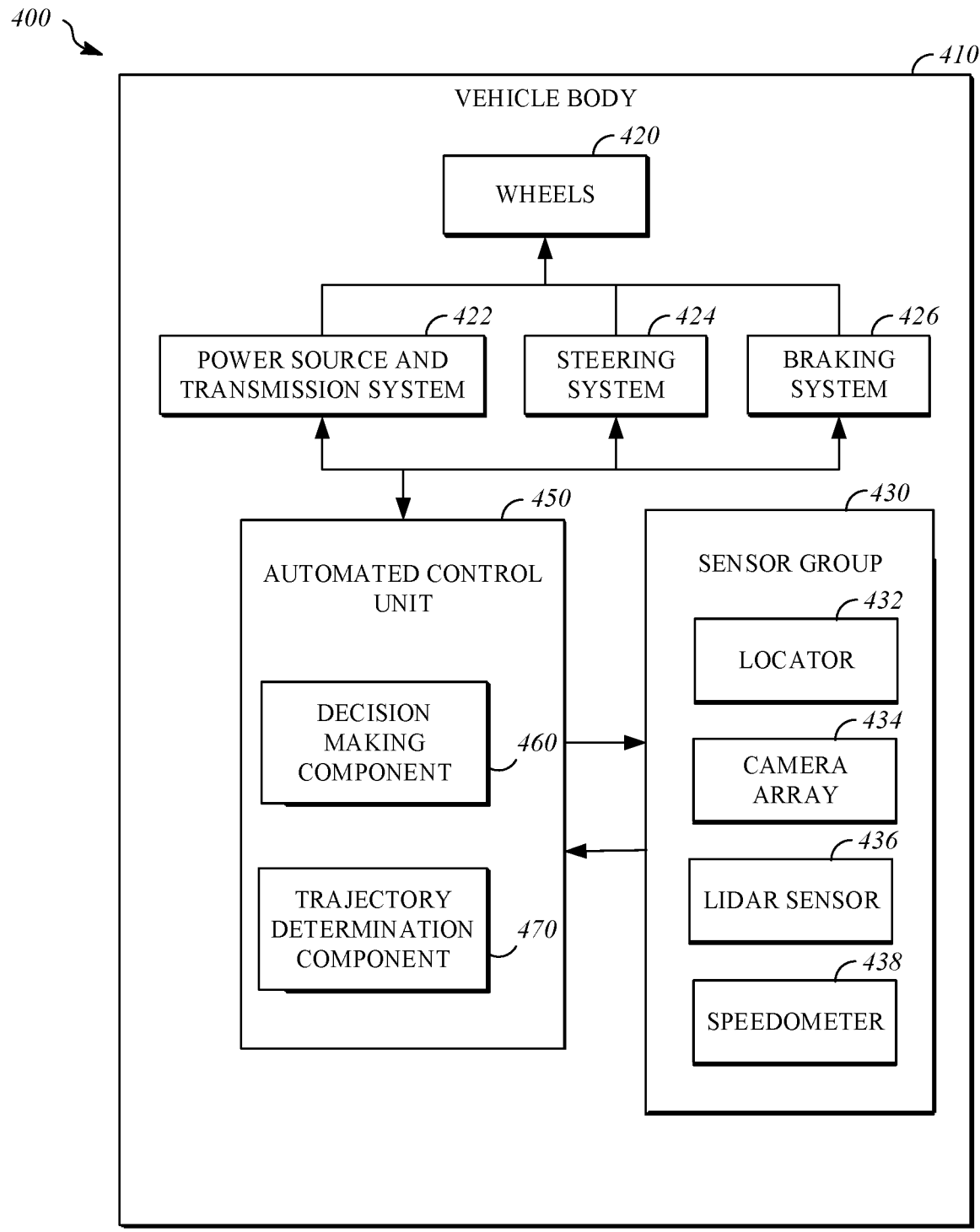
FIG. 4 is a block diagram of an example of a vehicle configured for lane change control.

FIG. 4 is a block diagram of an example of a vehicle 400 configured for lane change control. The vehicle 400 includes a vehicle body 410 that contains or is attached to the other systems and components of the vehicle 400. The vehicle 400 includes wheels 420 that are capable of serving as an interface between the vehicle 400 and a road. The wheels 420 provide control surfaces that may be used to guide the vehicle along paths on a road. The vehicle 400 includes actuators operable to cause motion of the vehicle body 410. The actuators include a power and transmission system 422, a steering system 424, and a braking system 426. The vehicle 400 includes a sensor group 430 for sensing an environment near the vehicle 400. The vehicle 400 includes an automated control unit 450 configures to maneuver the vehicle, based on sensor data from the sensor group 430, by sending control signals to the actuators (e.g., the power and transmission system 422, the steering system 424, and/or the braking system 426). For example, the vehicle 400 may use the automated control unit 450 to implement the process 700 of FIG. 7.

The vehicle 400 includes a power source (e.g., a combustion engine and/or a battery) connected to the wheels via a transmission system 422 capable of spinning the wheels to accelerate the vehicle along a road. The vehicle 400 includes a steering system 424 capable of turning the wheels 420 in relation to the vehicle body 410 to direct the motion of the vehicle, e.g., by controlling the yaw angle and angular velocity or path curvature of the vehicle.

The vehicle 400 includes a sensor group 430, configured to detect objects in a space near the vehicle. The sensor group 430 includes a locator 432 configured to determine a current location of the vehicle 400 (e.g., using a global positioning system receiver and/or an inertial measurement unit). The sensor group 430 includes a camera array 434, which may include one or more cameras mounted on the vehicle body 410 and oriented to capture images spanning a combined field of view. In some implementations, images from multiple cameras in the camera array may be stitched together to form a combined image of the space near the vehicle 400 (e.g., a panoramic image). The camera array 434 may include one or more visible spectrum sensors that may capture light in multiple spectral subranges corresponding to different colors (e.g., red, green, and blue) and a visible spectrum image output by the camera array 434 may include multiple color channels (e.g., RGB or YCrCb). The camera array 434 may include a color filter array (e.g., a Bayer filter) for capturing a multi-channel visible spectrum image. In some implementations, the camera array 434 is single channel (e.g., with a single filter for all sensor elements) and outputs black and white images. The sensor group 430 includes a lidar sensor 436 configured to detect objects in a space near the vehicle. For example, the lidar sensor 436 may scan the space near the vehicle using a pulsed laser (e.g., in an ultraviolet, visible, or near infrared spectrum) and detect backscattered or reflected pulses using one or more photodetectors (e.g., a photo diode, or a photo multiplier). In some implementations, the lidar sensor 436 uses an array of high speed detectors and a modulation sensitive detector array to image a space near the vehicle. For example, the lidar sensor 436 may use homodyne detection with an electronic charge coupled device or complementary metal-oxide-semiconductor shutter to image a three dimensional space near the vehicle 400. Delays between emission of a pulse and reception of a corresponding backscattered or reflected pulse may be measured and used to determine distances of detected objects. The lidar sensor 436 may output lidar data, including a sequence of three dimensional point clouds that reflect the presences of objects in the space near the vehicle 400. In some implementations, the sensor group 430 includes a radar system. The sensor group 430 includes a speedometer 438 for detecting a velocity of the vehicle 400. In some implementations (not shown in FIG. 4), the sensor group 430 includes a receiver for radar sensor for detecting objects in a space near the vehicle 400. In some implementations (not shown in FIG. 4), the sensor group 430 includes a receiver for wireless beacon or presence signals broadcast by other vehicles on the road. In some implementations (not shown in FIG. 4), the sensor group 430 includes wireless receiver for traffic description messages from a centralized traffic coordinator.

The vehicle 400 includes an automated control unit 450 that is configured to receive data from the sensor group 430 and possibly other sources (e.g., a vehicle passenger/operator control interface) and process the data to implement automated control of the motion of the vehicle 400 by sending control signals to actuators (e.g., the Power source & transmission system 422, the steering system 424, and the braking system 426) that actuate by these commands via the wheels 420 to maneuver the vehicle 400. In some implementations, the automated control unit 450 is configured to, determine motion plans for lane change based on a kinematic state of the vehicle 400 and sensor data describing objects (e.g., other vehicles) detected in a space near the vehicle 400. For example, the automated control unit 450 may be configured to implement process 700 as described in relation to FIG. 7. The automated control unit 450 may include specialized data processing and control hardware and/or software running on a data processing apparatus with additional capabilities.

The automated control unit 450 includes or interfaces with a decision making component 460 that is configured to determine whether a lane change maneuver is feasible, identify a gap in a target lane to be entered during a lane change maneuver, and determine other parameters of the lane change maneuver; such as a preparation phase duration, an execution phase duration, and an initial guess for an acceleration profile to be used during a preparation phase. For example, the decision making component 460 may receive sensor data from one or more sensors of the sensor group 430 as input and the decision making component 460 may output a set of parameters specifying a homotopy class of motion plans for a lane change maneuver. The decision making component 460 may determine a set of constraints, including a headway constraint, and determine the set of parameters based on the set of constraints (e.g., using a optimization process to select the values of the set of parameters subject to the set of constraints). For example, decision making component 460 may determine the set of parameters according to (EQ 18) or (EQ 19). The decision making component 460 may include specialized data processing and control hardware and/or software running on a data processing apparatus with additional capabilities.

The automated control unit 450 includes or interfaces with a trajectory determination component 470 that is configured to determine a motion plan for maneuvering the vehicle 400 from an origin lane into a target lane. The automated control unit 450 may pass a set of parameters specifying a homotopy class of motion plans for a lane change maneuver from the decision making component 460 to the trajectory determination component 470. The trajectory determination component 470 may determine a motion plan for lane change using a focused search based on the set of parameters. The trajectory determination component 470 may include specialized data processing and control hardware and/or software running on a data processing apparatus with additional capabilities.

In some implementations (not shown in FIG. 4), the vehicle 400 includes a wireless networking interface. For example, the wireless networking interface may be used to transmit data to and receive data from a computing device (e.g., the computing device 600) that implements a decision making component and a trajectory determination component. For example, wireless networking interface may be configured to transmit and receive signals according to a wireless networking standard (e.g., Bluetooth, ZigBee, Wi-Fi or WiMAX).

Figure 5:
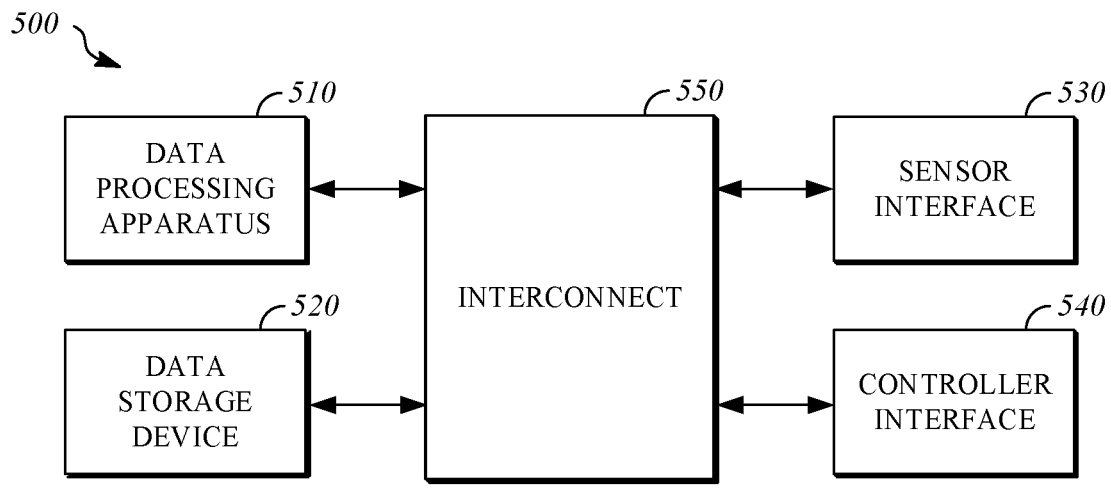
FIG. 5 is a block diagram of an example of a hardware configuration for a vehicle controller.

FIG. 5 is a block diagram of an example of a hardware configuration for a vehicle controller 500. The hardware configuration may include a data processing apparatus 510, a data storage device 520, a sensor interface 530, a controller interface 540, and an interconnect 550 through which the data processing apparatus 510 may access the other components. The vehicle controller 500 may be configured to control lane change of a vehicle. For example, the vehicle controller 500 may be configured to implement the process 700 of FIG. 7.

The data processing apparatus 510 is operable to execute instructions that have been stored in a data storage device 520. In some implementations, the data processing apparatus 510 is a processor with random access memory for temporarily storing instructions read from the data storage device 520 while the instructions are being executed. The data processing apparatus 510 may include single or multiple processors each having single or multiple processing cores. Alternatively, the data processing apparatus 510 may include another type of device, or multiple devices, capable of manipulating or processing data. For example, the data storage device 520 may be a non-volatile information storage device such as a hard drive, a solid-state drive, a read-only memory device (ROM), an optical disc, a magnetic disc, or any other suitable type of storage device such as a non-transitory computer readable memory. The data storage device 520 may include another type of device, or multiple devices, capable of storing data for retrieval or processing by the data processing apparatus 510. For example, the data storage device 520 can be distributed across multiple machines or devices such as network-based memory or memory in multiple machines performing operations that can be described herein as being performed using a single computing device for ease of explanation. The data processing apparatus 510 may access and manipulate data in stored in the data storage device 520 via interconnect 550. For example, the data storage device 520 may store instructions executable by the data processing apparatus 510 that upon execution by the data processing apparatus 510 cause the data processing apparatus 510 to perform operations (e.g., operations that implement the process 700 of FIG. 7).

The sensor interface 530 may be configured to control and/or receive data (e.g., a lidar point cloud, acceleration measurements, angular rate measurements, and/or a visible spectrum image) from one or more sensors (e.g., the locator 432, the camera array 434, the lidar sensor 436, and/or the speedometer 438). In some implementations, the sensor interface 530 may implement a serial port protocol (e.g., I2C or SPI) for communications with one or more sensor devices over conductors. In some implementations, the sensor interface 530 may include a wireless interface for communicating with one or more sensor groups via low-power, short-range communications (e.g., using a vehicle area network protocol).

The controller interface 540 allows input and output of information to other systems within a vehicle to facilitate automated control of the vehicle. For example, the controller interface 540 may include serial ports (e.g., RS-232 or USB) used to issue control signals to actuators in the vehicle (e.g., the power source and transmission system 422, the steering system 424, and the braking system 426) and to receive sensor data from a sensor group (e.g., the sensor group 430). For example, the interconnect 550 may be a system bus, or a wired or wireless network (e.g., a vehicle area network).

Figure 6:
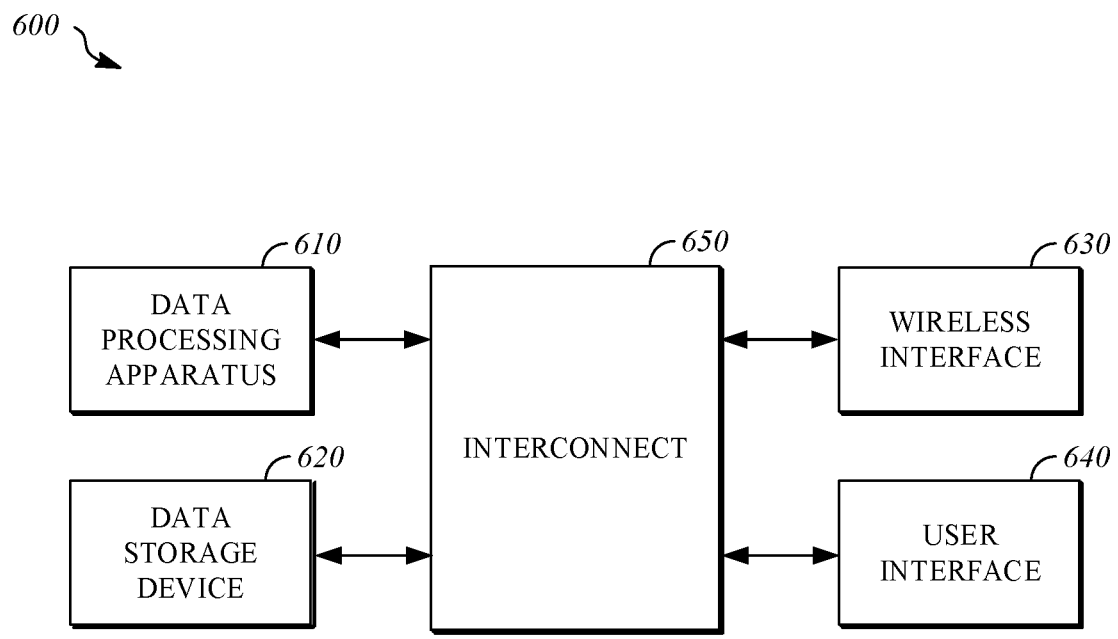
FIG. 6 is a block diagram of an example of a hardware configuration of a computing device.

FIG. 6 is a block diagram of an example of a hardware configuration of a computing device 600. The hardware configuration may include a data processing apparatus 610, a data storage device 620, wireless interface 630, a user interface 640, and an interconnect 650 through which the data processing apparatus 610 may access the other components. The computing device 600 may be configured to control lane change of a vehicle. For example, the computing device 600 may be configured to implement the process 700 of FIG. 7.

The data processing apparatus 610 is operable to execute instructions that have been stored in a data storage device 620. In some implementations, the data processing apparatus 610 is a processor with random access memory for temporarily storing instructions read from the data storage device 620 while the instructions are being executed. The data processing apparatus 610 may include single or multiple processors each having single or multiple processing cores. Alternatively, the data processing apparatus 610 may include another type of device, or multiple devices, capable of manipulating or processing data. For example, the data storage device 620 may be a non-volatile information storage device such as a hard drive, a solid-state drive, a read-only memory device (ROM), an optical disc, a magnetic disc, or any other suitable type of storage device such as a non-transitory computer readable memory. The data storage device 620 may include another type of device, or multiple devices, capable of storing data for retrieval or processing by the data processing apparatus 610. For example, the data storage device 620 can be distributed across multiple machines or devices such as network-based memory or memory in multiple machines performing operations that can be described herein as being performed using a single computing device for ease of explanation. The data processing apparatus 610 may access and manipulate data in stored in the data storage device 620 via interconnect 650. For example, the data storage device 620 may store instructions executable by the data processing apparatus 610 that upon execution by the data processing apparatus 610 cause the data processing apparatus 610 to perform operations (e.g., operations that implement the process 700 of FIG. 7).

The wireless interface 630 facilitates communication with other devices, for example, a vehicle (e.g., the vehicle 400). For example, wireless interface 630 may facilitate communication via a vehicle Wi-Fi network with a vehicle controller (e.g., the vehicle controller 500 of FIG. 5). For example, wireless interface 630 may facilitate communication via a vehicle area network.

The user interface 640 allows input and output of information from/to a user. In some implementations, the user interface 640 can include a display, which can be a liquid crystal display (LCD), a cathode-ray tube (CRT), a light emitting diode (LED) display (e.g., an OLED display), or other suitable display. For example, the user interface 640 may include a touchscreen. For example, the user interface 640 may include a head-mounted display (e.g., virtual reality goggles or augmented reality glasses). For example, the user interface 640 may include a positional input device, such as a mouse, touchpad, touchscreen, or the like; a keyboard; or other suitable human or machine interface devices. For example, the interconnect 650 may be a system bus, or a wired or wireless network (e.g., a vehicle area network).

Figure 7:
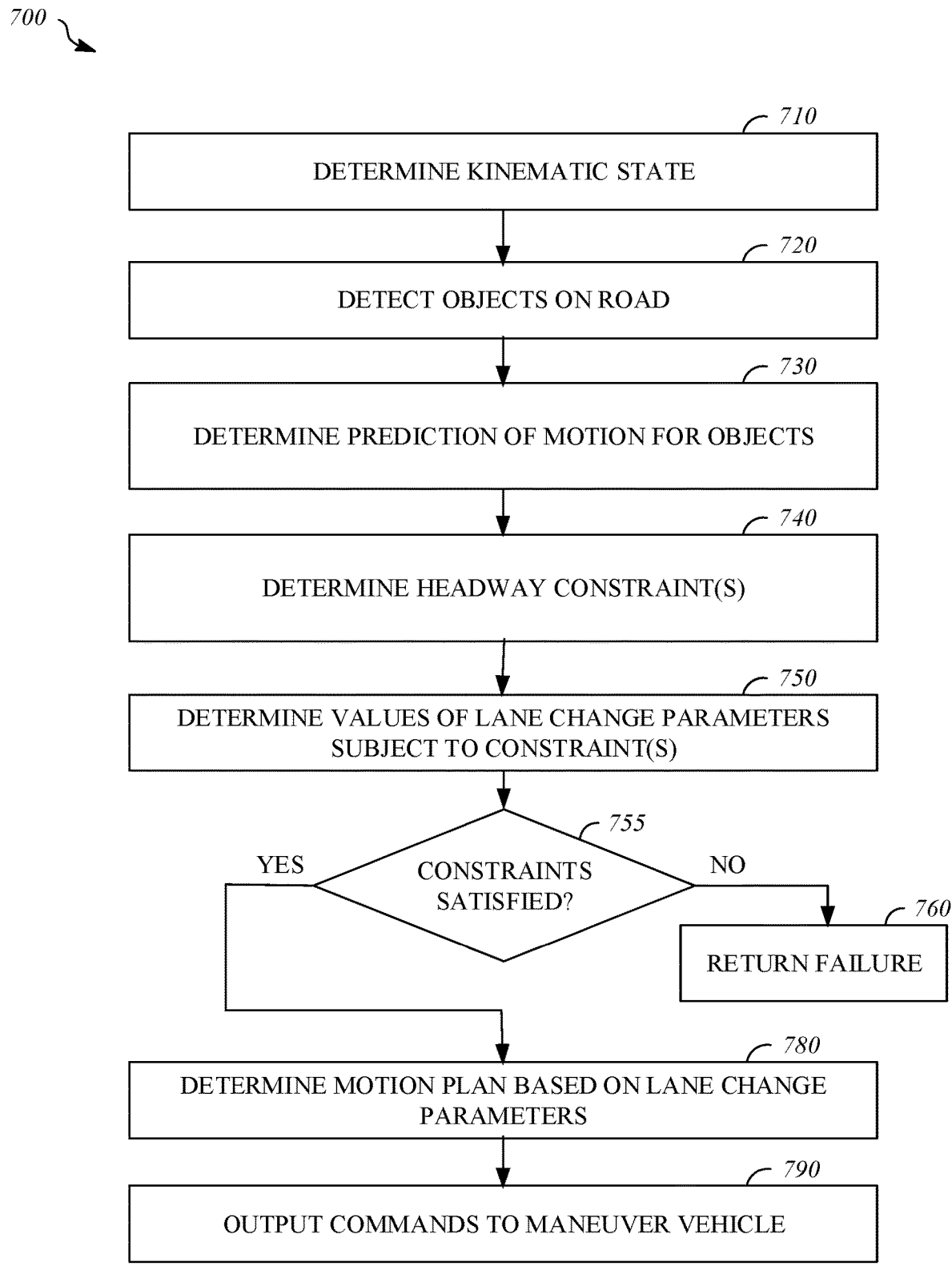
FIG. 7 is a flowchart of an example of a process for controlling lane change of a vehicle.

FIG. 7 is a flowchart of an example of a process 700 for controlling lane change of a vehicle. The process 700 includes determining 710 a kinematic state of a vehicle moving in an origin lane along a road with lanes; detecting 720, based at least in part on data from one or more sensors of the vehicle, one or more objects that are moving in a target lane of the road that is adjacent to the origin lane; determining 730 a prediction of motion of the one or more objects in the target lane; determining 740 a headway constraint in terms of a preparation time, a preparation acceleration to be applied to the vehicle during the preparation time, and an execution time commencing after the preparation time during which the vehicle is to transition from the origin lane to the target lane, wherein the headway constraint is determined based on the kinematic state and the prediction of motion of the one or more objects; determining 750 values of the preparation time, the execution time, and the preparation acceleration subject to a set of constraints including the headway constraint; when (at operation 755) it has been determined that the vehicle can transition to the target lane while satisfying the set of constraints, determining 780 a motion plan that will transition the vehicle from the origin lane to the target lane based at least in part on the preparation time, the execution time, and the preparation acceleration; and outputting 790 commands to actuators to maneuver the vehicle into the target lane, wherein the commands are based on the motion plan. For example, the process 700 may be implemented by a vehicle, such as the vehicle 400 of FIG. 4. For example, the process 700 may be implemented by a vehicle controller, such as the vehicle controller 500 of FIG. 5. For example, the process 700 may be implemented by a computing device, such as the computing device 600 of FIG. 6.

The process 700 includes determining 710 a kinematic state of a vehicle moving in an origin lane along a road with lanes. For example, the kinematic state may include the ego vehicle's position, orientation, direction, speed, acceleration, angular velocities, and/or curvature. In some implementations, the kinematic state is determined 710 using motion sensors (e.g., accelerometers, gyroscopes, and/or magnetometers). In some implementations, the kinematic state is determined 710 using a Global Positioning System (GPS) receiver. In some implementations, the kinematic state is determined 710 based on sensor data reflecting the motion and alignment of the wheels of the ego vehicle. In some implementations, the kinematic state is determined 710 by fusing (e.g., using a Kalman filter) information from a variety of different types of sensors and/or positioning systems. For example, the kinematic state may be determined 710 based on data from the sensor group 430 of FIG. 4. For example, the kinematic state may be determined 710 based on data received via the sensor interface 530 of FIG. 5. For example, the kinematic state may be determined 710 based on sensor data received via the wireless interface 630 of FIG. 6.

The process 700 includes detecting 720, based at least in part on data from one or more sensors of the vehicle, one or more objects (e.g., vehicles) that are moving in a target lane of the road that is adjacent to the origin lane. In some implementations, objects in the target lane are detected 720, by processing data from cameras mounted on the ego vehicle (e.g., from the camera array 434). In some implementations, objects in the target lane are detected 720, by processing data from a radio detection and ranging (RADAR) system mounted on the ego vehicle. In some implementations, objects in the target lane are detected 720, by processing data from lidar system mounted on the ego vehicle (e.g., from the lidar sensor 436). In some implementations, vehicles in the target lane are detected 720, by receiving beacon or presence signals from those vehicles via wireless communications and processing those signals. In some implementations, vehicles in the target lane are detected 720, by receiving traffic description messages from a centralized traffic coordinator via wireless communications and processing those messages. The one or more objects may demarcate multiple gaps in the target lane.

The process 700 includes determining 730 a prediction of motion of the one or more objects in the target lane. The velocity of a detected 720 object (e.g., a vehicle) may be estimated based on sensor data (e.g., based on the kinematic state of the ego vehicle and how the object moves in relation to the ego vehicle over a window of time). For example, the prediction of motion for the object may be determined 730 based on the estimate of its current velocity and an assumption that the object will continue moving at a constant speed along the road within its current lane (e.g., the target lane) for the duration of the a motion planning time horizon t_h.

The process 700 includes determining 740 one or more headway constraints in terms of a preparation time, a preparation acceleration to be applied to the vehicle during the preparation time, and an execution time commencing after the preparation time during which the vehicle is to transition from the origin lane to the target lane. The one or more headway constraints may be determined 740 based on the kinematic state of the ego vehicle and the prediction of motion of the one or more objects. For example, a headway constraint may be determined 740 in relation to a leading vehicle in the origin lane, a trailing vehicle in the origin lane, a vehicle leading a gap in the target lane, and/or a vehicle training a gap in the target lane. In some implementations, the one or more headway constraints may be determined 740 in accordance with (EQ 8), (EQ 9), (EQ 13), (EQ 14), (EQ 16), or (EQ 17). In some implementations, a headway constraint is determined 740 in terms of a gap selection index that identifies one of multiple gaps in the target lane that the vehicle is to transition into. For example, the process 800 of FIG. 8 may be implemented to determine 740 one or more headway constraints.

The process 700 includes determining 750 values of lane change parameters. For example, the process 700 may include determining 750 values of the preparation time, the execution time, and the preparation acceleration subject to a set of constraints including the headway constraint. The set of constraints may include a time limit (e.g., t_h) within which the vehicle must complete transition from the origin lane into the target lane. In some implementations, constrained optimization processing is performed (e.g., using open or otherwise available solvers such as CPLEX, Gurobi, miniSAT, GSAT, or WalkSAT) to determine 750 values of the preparation time, the execution time, and the preparation acceleration subject to the set of constraints. For example, values of the preparation time, the execution time, and the preparation acceleration may be determined in accordance with (EQ 18). In some implementations, a gap in the target lane is also identified by determining 750 a value of a gap selection index subject to a set of constraints including the headway constraint. The value of the gap selection index may define a homotopy class of motion plans. For example, values of the gap selection index, the preparation time, the execution time, and the preparation acceleration may be determined 750 (e.g., using open or otherwise available solvers such as CPLEX, Gurobi, miniSAT, GSAT, or WalkSAT) in accordance with (EQ 19).

If (at operation 755) it has been determined that the vehicle cannot transition to the target lane while satisfying the set of constraints, then a decision making component (e.g., the decision making component 460) may return 760 failure (i.e., indicating the lane change is not currently feasible). In this case, the vehicle may continue to maneuver based on prior or alternative motion plan to remain in the origin lane.

When (at operation 755) it has been determined that the vehicle can transition to the target lane while satisfying the set of constraints, the process 700 includes determining 780 a motion plan that will transition the vehicle from the origin lane to the target lane based at least in part on the preparation time, the execution time, and the preparation acceleration. In some implementations, a motion plan is determined 780 that will transition the vehicle from the origin lane to a gap in the target lane that is identified by the value of the gap selection index. The motion plan may be determined 780 using a more complete vehicle dynamics model than the simpler kinematic model used to determine 750 the parameters of the lane change. The motion plan may be determined 780 based on the gap selection index, the preparation time, the execution time, and/or the preparation acceleration determined 750 previously (e.g., by the decision making component 460). This may reduce the complexity of the motion plan determination by focusing the search on motion plans satisfying constraints imposed by these lane change parameters and/or initializing values (e.g., an initial acceleration/velocity profile) used in the search. In some implementations, the motion plan is determined 780 using a constrained iterative linear-quadratic regulator (iLQR) optimizer.

The process 700 includes outputting 790 commands to actuators to maneuver the vehicle into the target lane. The commands may be based on the motion plan. For example, commands may be output 790 to a power source and transmission system (e.g., the power source and transmission system 422), a steering system (e.g., the steering system 424), and/or a braking system (e.g., the braking system 426). For example, the commands may be output 790 by the automated control unit 450, the vehicle controller 500, or the computing device 600. For example, the commands may be output 790 via the controller interface 540, or the wireless interface 630. For example, maneuvering the vehicle may include accelerating, turning, and/or stopping.

Figure 8:
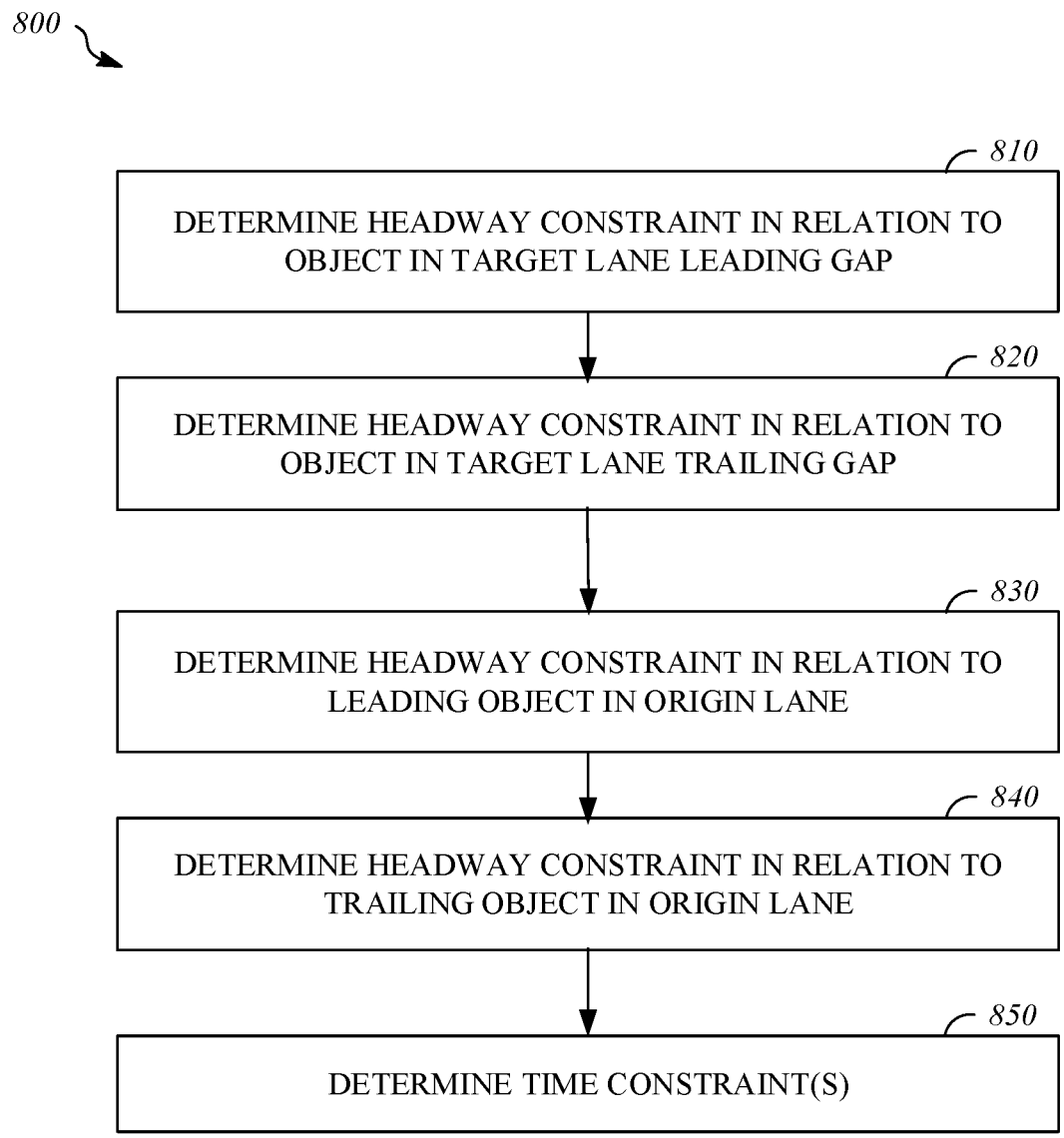
FIG. 8 is a flowchart of an example of a process for determining headway constraints.

FIG. 8 is a flowchart of an example of a process 800 for determining headway constraints. The process 800 includes determining 810 a headway constraint in relation to an object that is leading a gap in a target lane; determining 820 a headway constraint in relation to an object that is trailing the gap in a target lane; determining 830 a headway constraint in relation to an object that is leading the ego vehicle in an origin lane; determining 840 a headway constraint in relation to an object that is trailing the ego vehicle in the origin lane; and determining 850 one or more time constraints for a motion plan to change lanes. For example, the process 700 may be implemented by a vehicle, such as the vehicle 400 of FIG. 4. For example, the process 700 may be implemented by a vehicle controller, such as the vehicle controller 500 of FIG. 5. For example, the process 700 may be implemented by a computing device, such as the computing device 600 of FIG. 6.

The process 800 includes determining 810 a first headway constraint in relation to a first object of the one or more objects that demarcates a gap in the target lane. The first object may lead a gap in the target lane. The first headway constraint may be determined 810 in terms of the preparation time, the preparation acceleration, and the execution time. For example, the first headway constraint may be determined 810 in accordance with the first inequality of (EQ 13). For example, the first headway constraint may be determined 810 in accordance with the first inequality of (EQ 8). The set of constraints, which are used to determine 750 the preparation time, the preparation acceleration, and the execution time (as described in relation to FIG. 7), may include the first headway constraint.

The process 800 includes determining 820 a second headway constraint in terms of the preparation time, the preparation acceleration, and the execution time. The second headway constraint may be in relation to a second object of the one or more objects that trails the gap in the target lane. For example, the second headway constraint may be determined 810 in accordance with the second inequality of (EQ 13). For example, the second headway constraint may be determined 810 in accordance with the second inequality of (EQ 8). The set of constraints; which is used to determine 750 values of the preparation time, the preparation acceleration, the execution time, and/or the gap selection index (as described in relation to FIG. 7); may include the second headway constraint.

The process 800 includes determining 830 a third headway constraint in terms of the preparation time, the preparation acceleration, and the execution time. The third headway constraint may be in relation to a leading object in the origin lane. The leading object moving in the origin lane ahead of the vehicle may be detected based at least in part on data from one or more sensors mounted on the vehicle (e.g., one or more sensors of the sensor group 430). For example, the third headway constraint may be determined 810 in accordance with the first inequality of (EQ 14). For example, the third headway constraint may be determined 810 in accordance with the first inequality of (EQ 9). The set of constraints; which is used to determine 750 values of the preparation time, the preparation acceleration, the execution time, and/or the gap selection index (as described in relation to FIG. 7); may include the third headway constraint.

The process 800 includes determining 840 a fourth headway constraint in terms of the preparation time, the preparation acceleration, and the execution time. The fourth headway constraint may be in relation to a trailing object in the origin lane. The trailing object moving in the origin lane behind the vehicle may be detected based at least in part on data from the one or more sensors mounted on the vehicle (e.g., one or more sensors of the sensor group 430). For example, the fourth headway constraint may be determined 810 in accordance with the second inequality of (EQ 14). For example, the fourth headway constraint may be determined 810 in accordance with the second inequality of (EQ 9). The set of constraints; which is used to determine 750 values of the preparation time, the preparation acceleration, the execution time, and/or the gap selection index (as described in relation to FIG. 7); may include the fourth headway constraint.

The process 800 includes determining 850 one or more time constraints. The set of constraints; which is used to determine 750 values of the preparation time, the preparation acceleration, the execution time, and/or the gap selection index (as described in relation to FIG. 7); may include the one or more time constraints. The set of constraints may include a time limit within which the vehicle must complete transition from the origin lane into the target lane (e.g., the time limit of (EQ 15)). For example, the time limit may correspond to a motion planning time horizon. The set of constraints may include a time limit within which the vehicle must begin transition from the origin lane into the target lane (e.g., the time limit of (EQ 12)).

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A vehicle comprising:
a vehicle body;
actuators operable to cause motion of the vehicle body;
one or more sensors configured to detect objects external to the vehicle; and
an automated control unit configured to:
 determine a kinematic state of the vehicle moving in an origin lane along a road with lanes,
 detect, based at least in part on data from the one or more sensors, one or more objects that are moving in a target lane of the road that is adjacent to the origin lane,
 determine a prediction of motion of the one or more objects in the target lane, determine a headway constraint in terms of a preparation time, a preparation acceleration to be applied to the vehicle during the preparation time, and an execution time commencing after the preparation time during which the vehicle is to transition from the origin lane to the target lane, wherein the headway constraint is determined based on the kinematic state and the prediction of motion of the one or more objects,
 determine values of the preparation time, the execution time, and the preparation acceleration subject to a set of constraints including the headway constraint,
 when it has been determined that the vehicle can transition to the target lane while satisfying the set of constraints, determine a motion plan that will transition the vehicle from the origin lane to the target lane based at least in part on the preparation time, the execution time, and the preparation acceleration, and
 output commands to the actuators to maneuver the vehicle into the target lane, wherein the commands are based on the motion plan.

2. The vehicle of claim 1, wherein the headway constraint is a first headway constraint in relation to a first object of the one or more objects that leads a gap in the target lane, and wherein the automated control unit is configured to:
determine a second headway constraint in terms of the preparation time, the preparation acceleration, and the execution time, wherein the second headway constraint is in relation to a second object of the one or more objects that trails the gap in the target lane; and
wherein the set of constraints includes the second headway constraint.

3. The vehicle of claim 1, wherein the headway constraint is a first headway constraint in relation to a first object of the one or more objects that demarcates a gap in the target lane, and wherein the automated control unit is configured to:
detect, based at least in part on data from the one or more sensors, a leading object moving in the origin lane ahead of the vehicle;
determine a second headway constraint in terms of the preparation time, the preparation acceleration, and the execution time, wherein the second headway constraint is in relation to the leading object in the origin lane; and
wherein the set of constraints includes the second headway constraint.

4. The vehicle of claim 1, wherein the headway constraint is a first headway constraint in relation to a first object of the one or more objects that demarcates a gap in the target lane, and wherein the automated control unit is configured to:
detect, based at least in part on data from the one or more sensors, a trailing object moving in the origin lane behind the vehicle;
determine a second headway constraint in terms of the preparation time, the preparation acceleration, and the execution time, wherein the second headway constraint is in relation to the trailing object in the origin lane; and wherein the set of constraints includes the second headway constraint.

5. The vehicle of claim 1, wherein the one or more objects demarcate multiple gaps in the target lane, and wherein the automated control unit is further configured to:
   determine the headway constraint in terms of a gap selection index that identifies one of the multiple gaps that the vehicle is to transition into;
   determine a value of the gap selection index subject to a set of constraints including the headway constraint; and
   determine the motion plan that will transition the vehicle from the origin lane to a gap in the target lane that is identified by the value of the gap selection index.

6. The vehicle of claim 5, wherein the value of the gap selection index defines a homotopy class of motion plans.

7. The vehicle of claim 1, wherein the set of constraints comprises a time limit within which the vehicle must complete transition from the origin lane into the target lane.

8. A method comprising:
   determining a kinematic state of a vehicle moving in an origin lane along a road with lanes;
   detecting, based at least in part on data from one or more sensors of the vehicle, one or more objects that are moving in a target lane of the road that is adjacent to the origin lane;
   determining a prediction of motion of the one or more objects in the target lane;
   determining a headway constraint in terms of a preparation time, a preparation acceleration to be applied to the vehicle during the preparation time, and an execution time commencing after the preparation time during which the vehicle is to transition from the origin lane to the target lane, wherein the headway constraint is determined based on the kinematic state and the prediction of motion of the one or more objects;
   determining values of the preparation time, the execution time, and the preparation acceleration subject to a set of constraints including the headway constraint;
   when it has been determined that the vehicle can transition to the target lane while satisfying the set of constraints, determining a motion plan that will transition the vehicle from the origin lane to the target lane based at least in part on the preparation time, the execution time, and the preparation acceleration; and
   outputting commands to actuators to maneuver the vehicle into the target lane, wherein the commands are based on the motion plan.

9. The method of claim 8, wherein the headway constraint is a first headway constraint in relation to a first object of the one or more objects that leads a gap in the target lane, comprising:
   determining a second headway constraint in terms of the preparation time, the preparation acceleration, and the execution time, wherein the second headway constraint is in relation to a second object of the one or more objects that trails the gap in the target lane; and
   wherein the set of constraints includes the second headway constraint.

10. The method of claim 8, wherein the headway constraint is a first headway constraint in relation to a first object of the one or more objects that demarcates a gap in the target lane, comprising:
    detecting, based at least in part on data from the one or more sensors, a leading object moving in the origin lane ahead of the vehicle;
    determining a second headway constraint in terms of the preparation time, the preparation acceleration, and the execution time, wherein the second headway constraint is in relation to the leading object in the origin lane; and
    wherein the set of constraints includes the second headway constraint.

11. The method of claim 8, wherein the headway constraint is a first headway constraint in relation to a first object of the one or more objects that demarcates a gap in the target lane, comprising:
    detecting, based at least in part on data from the one or more sensors, a trailing object moving in the origin lane behind the vehicle;
    determining a second headway constraint in terms of the preparation time, the preparation acceleration, and the execution time, wherein the second headway constraint is in relation to the trailing object in the origin lane; and
    wherein the set of constraints includes the second headway constraint.

12. The method of claim 8, wherein the one or more objects demarcate multiple gaps in the target lane, and wherein the method further comprises:
    determining the headway constraint in terms of a gap selection index that identifies one of the multiple gaps that the vehicle is to transition into;
    determining a value of the gap selection index subject to a set of constraints including the headway constraint; and
    determining the motion plan that will transition the vehicle from the origin lane to a gap in the target lane that is identified by the value of the gap selection index.

13. The method of claim 12, wherein the value of the gap selection index defines a homotopy class of motion plans.

14. The method of claim 8, wherein the set of constraints comprises a time limit within which the vehicle must complete transition from the origin lane into the target lane.

15. A system, comprising:
    a data processing apparatus; and
    a data storage device storing instructions executable by the data processing apparatus that upon execution by the data processing apparatus cause the system to perform operations comprising:
       determining a kinematic state of a vehicle moving in an origin lane along a road with lanes,
       detecting, based at least in part on data from one or more sensors of the vehicle, one or more objects that are moving in a target lane of the road that is adjacent to the origin lane,
       determining a prediction of motion of the one or more objects in the target lane,
       determining a headway constraint in terms of a preparation time, a preparation acceleration to be applied to the vehicle during the preparation time, and an execution time commencing after the preparation time during which the vehicle is to transition from the origin lane to the target lane, wherein the headway constraint is determined based on the kinematic state and the prediction of motion of the one or more objects,
       determining values of the preparation time, the execution time, and the preparation acceleration subject to a set of constraints including the headway constraint,
       when it has been determined that the vehicle can transition to the target lane while satisfying the set of constraints, determining a motion plan that will transition the vehicle from the origin lane to the target lane based at least in part on the preparation time, the execution time, and the preparation acceleration, and outputting commands to actuators to maneuver the vehicle into the target lane, wherein the commands are based on the motion plan.

16. The system of claim 15, wherein the headway constraint is a first headway constraint in relation to a first object of the one or more objects that leads a gap in the target lane, and wherein the operations comprise:

determining a second headway constraint in terms of the preparation time, the preparation acceleration, and the execution time, wherein the second headway constraint is in relation to a second object of the one or more objects that trails the gap in the target lane; and wherein the set of constraints includes the second headway constraint.

17. The system of claim 15, wherein the headway constraint is a first headway constraint in relation to a first object of the one or more objects that demarcates a gap in the target lane, and wherein the operations comprise:

detecting, based at least in part on data from the one or more sensors, a leading object moving in the origin lane ahead of the vehicle;

determining a second headway constraint in terms of the preparation time, the preparation acceleration, and the execution time, wherein the second headway constraint is in relation to the leading object in the origin lane; and wherein the set of constraints includes the second headway constraint.

18. The system of claim 15, wherein the headway constraint is a first headway constraint in relation to a first object of the one or more objects that demarcates a gap in the target lane, and wherein the operations comprise:

detecting, based at least in part on data from the one or more sensors, a trailing object moving in the origin lane behind the vehicle;

determining a second headway constraint in terms of the preparation time, the preparation acceleration, and the execution time, wherein the second headway constraint is in relation to the trailing object in the origin lane; and wherein the set of constraints includes the second headway constraint.

19. The system of claim 15, wherein the one or more objects demarcate multiple gaps in the target lane, and wherein the operations further comprise:

determining the headway constraint in terms of a gap selection index that identifies one of the multiple gaps that the vehicle is to transition into; and determining a value of the gap selection index subject to a set of constraints including the headway constraint; and determining the motion plan that will transition the vehicle from the origin lane to a gap in the target lane that is identified by the value of the gap selection index.

20. The system of claim 15, wherein the set of constraints comprises a time limit within which the vehicle must complete transition from the origin lane into the target lane.

* * * * *